United States Patent
Brodersen et al.

(10) Patent No.: US 11,972,087 B2
(45) Date of Patent: Apr. 30, 2024

(54) ADJUSTMENT OF AUDIO SYSTEMS AND AUDIO SCENES

(71) Applicant: SPATIALX, INC., Emeryville, CA (US)

(72) Inventors: Rainer Brodersen, San Clemente, CA (US); John Trudeau, Newbury Park, CA (US); Robert Aric Marshall, San Jose, CA (US); Kenneth Pearce, San Francisco, CA (US); Michael Plitkins, Piedmont, CA (US); Calin Pacurariu, Cave Creek, AZ (US)

( * ) Notice: Subject to any disclaimer, the term of this patent is extended or adjusted under 35 U.S.C. 154(b) by 0 days.

(21) Appl. No.: 18/118,688

(22) Filed: Mar. 7, 2023

(65) Prior Publication Data

US 2023/0280876 A1    Sep. 7, 2023

Related U.S. Application Data

(60) Provisional application No. 63/268,961, filed on Mar. 7, 2022.

(51) Int. Cl.
*G06F 3/04815* (2022.01)
*G06F 3/04842* (2022.01)

(52) U.S. Cl.
CPC ...... *G06F 3/04815* (2013.01); *G06F 3/04842* (2013.01)

(58) Field of Classification Search
CPC .................................................. G06F 3/04815
See application file for complete search history.

(56) References Cited

U.S. PATENT DOCUMENTS

| | | | |
|---|---|---|---|
| 10,904,687 B1 * | 1/2021 | Prospero | H04S 7/305 |
| 11,010,051 B2 * | 5/2021 | Eronen | G06F 3/012 |
| 2016/0212559 A1 * | 7/2016 | Mateos Sole | H04S 7/30 |
| 2017/0086008 A1 * | 3/2017 | Robinson | H04S 7/30 |
| 2019/0259205 A1 * | 8/2019 | Nissinen | G02B 27/017 |

* cited by examiner

*Primary Examiner* — Roland J Casillas
(74) *Attorney, Agent, or Firm* — Maschoff Brennan

(57) ABSTRACT

A method may include generating a graphical user interface (GUI) that includes a canvas visually displaying a virtual audio environment representing an arrangement of speakers in a real-world audio environment. The virtual audio environment may include an audio object that represents sounds that are grouped together to provide a particular sound effect. The method may include obtaining, via the GUI, a selection of a particular audio object displayed in the virtual audio environment and user input relating to the audio properties associated with the selected audio object. The method may include performing an audio computation based on the user input and updating the selected audio object represented in the canvas. The method may include displaying, via the GUI, the updated audio object in the canvas.

20 Claims, 11 Drawing Sheets

ADJUSTMENT OF AUDIO SYSTEMS AND AUDIO SCENES

The present disclosure generally relates to adjustment of audio systems and audio scenes.

BACKGROUND

Many environments are augmented with audio systems. For example, restaurants, sports bars, and hotel lobbies often include audio systems. The audio systems may play audio in the environment to create or add to an ambiance.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining user input relating to one or more audio objects displayed in a graphical user interface (GUI). The method may include performing an audio computation based on the user input and one or more parameters associated with the audio objects and updating the audio objects displayed in the GUI according to the audio computation.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
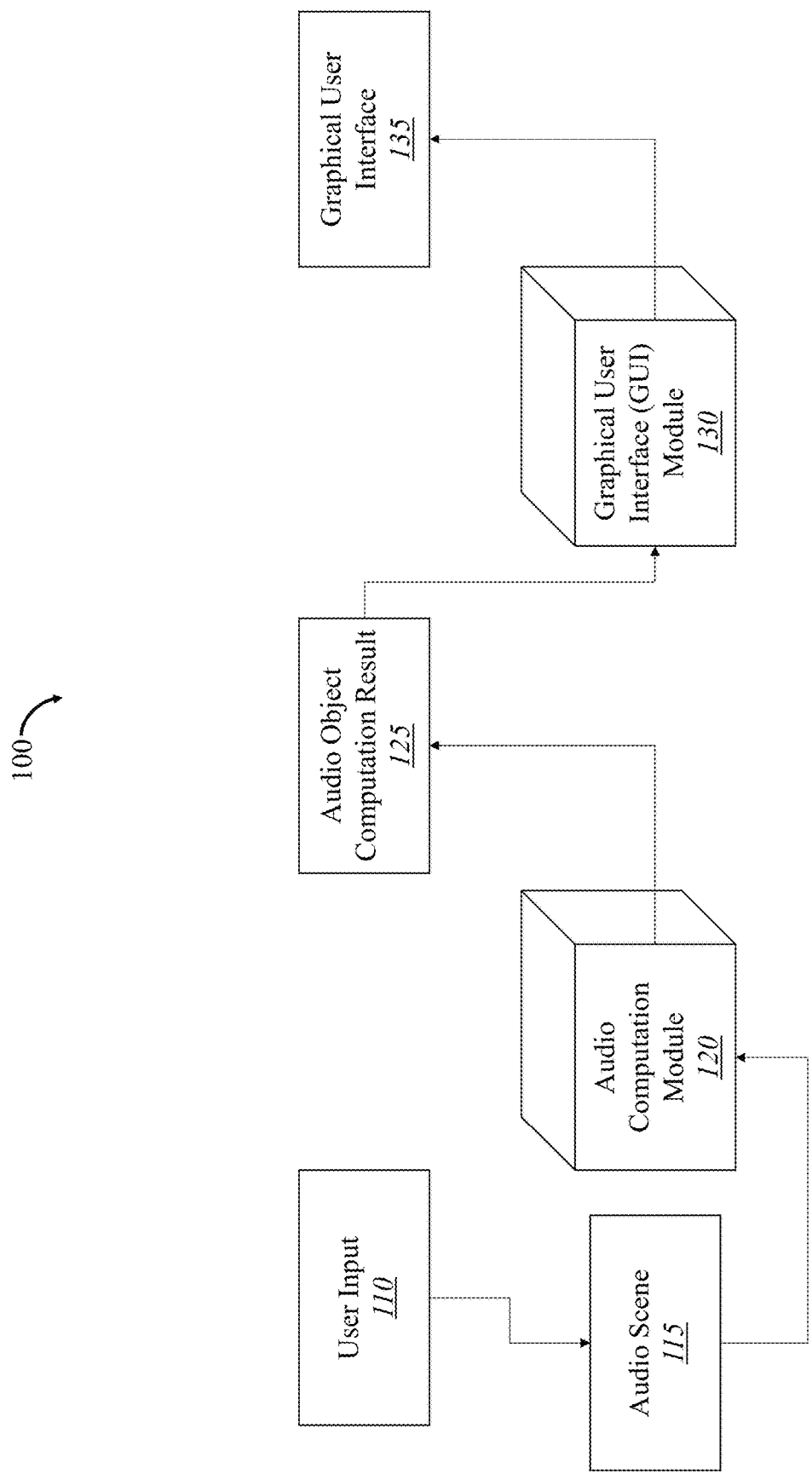
FIG. 1 is a diagram representing an example system configured to generate and display audio objects according to at least one embodiment of the present disclosure.

Configuring audio in an environment, such as a movie theater, a sound-recording studio, a home theater, a concert hall, an outdoors concert venue, or any other space that may include audio projection, may include adjusting properties of audio projected by one or more speakers included in the environment so that the audio is perceived by an audience in the environment as intended by a configuring user. However, configuring the audio projected in the audio environment may be complex or difficult because of the propagation properties of sound and/or the audio nature of sound as compared to a visual nature.

Configuring audio may be difficult and provide different considerations and challenges when compared to configuring visual effects because audio may include different physical properties and behaviors from visual objects. How the configured audio sounds within the environment may be difficult to model due to sound propagation properties. For example, audio from different sources or associated with different objects may overlap more easily than visual objects, resulting in the overlapping audio objects being harder to distinguish than overlapping visual objects. Further, sound may be projected from a certain source and may spread throughout the environment while also dissipating in volume. However, visualization of audio that may be presented in the environment may help improve the configuration and adjustment of such audio. Accordingly, configuration of different audio objects may be improved by providing clear visualization and distinguishment between individual audio objects.

In the present disclosure, the term "audio object" may relate to a series of sounds that are grouped together to provide a specific type of sound effect. Additionally or alternatively, audio objects may be respectively associated with a particular type of object that may be associated with the respective audio objects. The audio object may refer to a container for spatial and/or acoustic properties, such as sounds, positions, effects, volumes, start times, some combination thereof, or any other audio properties. For example, a particular audio object may include sounds that may be produced by a mouse, a stream, a bird, etc. As another example, a particular audio object may include sounds that may be produced by a specific instrument with respect to a specific song. Further, use of the term "audio objects" may include the sound waves of the corresponding audio, audio files that include stored audio data for producing the corresponding sound waves, signals having the corresponding audio data encoded thereon for projection (e.g., electrical signals provided to speakers that are then converted by the speakers into sound waves), visual depictions of the audio objects, some combination thereof, or any other representations of audio.

In some embodiments, an audio configuration system according to the present disclosure may include a graphical user interface (GUI) that displays a visual representation of audio objects that may be projected in an environment. The visual representation of the audio objects may also include behavior of the audio objects during the projection of the audio objects in the environment. The audio configuration system may facilitate introducing new audio objects and adjusting existing audio objects to be projected in the environment by a user. In these and other embodiments, the audio configuration system may provide options for a user to specify one or more properties of the audio objects. Additionally or alternatively, based on obtained user input regarding the audio object properties, the audio configuration system may compute and model the audio objects. The modeled audio objects may be displayed via the GUI as visual representations of the audio objects relative to the overall environment so that the user may better understand how particular user inputs affect the audio objects and the environment. Consequently, the audio configuration system according to the present disclosure may, among other things, improve specification and design of audio scenes that include multiple audio objects and complex interactions between the audio objects.

Embodiments of the present disclosure are explained with reference to the accompanying figures.

FIG. 1 is a diagram representing an example system 100 configured to generate and display audio objects according to at least one embodiment of the present disclosure. The system 100 may include an audio computation module 120 and/or a GUI module 130. Elements of the system 100, including, for example, the audio computation module 120 and/or the GUI module 130 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to user input 110, audio object computation results 125, and/or a GUI 135 as described in further detail below, such as in relation to method 1100 of FIG. 11.

In some embodiments, the user input 110 may include any adjustments to an audio scene 115 that may be represented as a virtual environment by the GUI 135 in which one or more audio objects may be represented and manipulated by the user input 110. For example, the user input 110 may include adding an audio object to the audio scene 115 displayed in the virtual audio environment by the GUI 135 and/or adjusting properties relating to one or more audio objects represented in the virtual audio environment. Because the user input 110 may specify the properties of the audio objects, the audio computation module 120 may obtain the user input 110 and/or the properties of the audio objects based on the user input 110 to compute corresponding audio object computation results 125.

In these and other embodiments, the user input 110 may or may not refer to user commands made directly in the virtual environment of the GUI 135. The user input 110 may include an input made by a computer system that affects the audio scene 115 and/or any audio objects included in the audio scene 115. For example, a particular user input 110 may involve loading a particular audio scene 115 from a data storage in which loading the particular audio scene 115 is reflected as changes in the virtual environment of the GUI 135. As an additional or alternative example, the user input 110 may include a user's interactions with another client application in which the user's interactions with the other client application are processed by the client application and fed through the audio computation module 120 to update the audio scene 115.

The audio object computation results 125 may include information relating to a visual representation of the audio objects based on the specified audio object properties included in the user input 110. For example, a particular user input 110 that involves dragging the particular audio object from a first location to a second location may result in a particular audio object computation result 125 that identifies positional coordinates of the particular audio object that correspond to the second location. As another example, a particular user input 110 that involves specifying a size of a particular audio object may result in a particular audio object computation result 125 that identifies multiple coordinates indicating a range of the particular audio object based on the specified size. Additionally or alternatively, the audio object computational results 125 may include information relating to a visual representation of audio objects not directly specified by the user input 110. In other words, the audio computation module 120 may model a second, a third, a fourth, or any other number of audio objects based on user input 110 involving a first audio object.

In some embodiments, the GUI module 130 may be configured to display visualizations or other representations of audio objects via the GUI 135. Accordingly, the audio object computation results 125 may be obtained by the GUI module 130, and the GUI 135 may be generated based on the audio object computation results 125. In these and other embodiments, the user may interact with the audio objects via the GUI 135 such that the user makes user inputs 110 according to the visualized audio objects displayed on the GUI 135. Various user inputs and/or audio object properties visualized by the GUI 135 are described in further detail in relation to the descriptions of FIGS. 2-10B below.

Modifications, additions, or omissions may be made to the system 100 without departing from the scope of the present disclosure. For example, the designations of different elements in the manner described is meant to help explain concepts described herein and is not limiting. For instance, in some embodiments, the audio computation module 120 and the GUI module 130 are delineated in the specific manner described to help with explaining concepts described herein but such delineation is not meant to be limiting. Further, the system 100 may include any number of other elements or may be implemented within other systems or contexts than those described.

Figure 2:
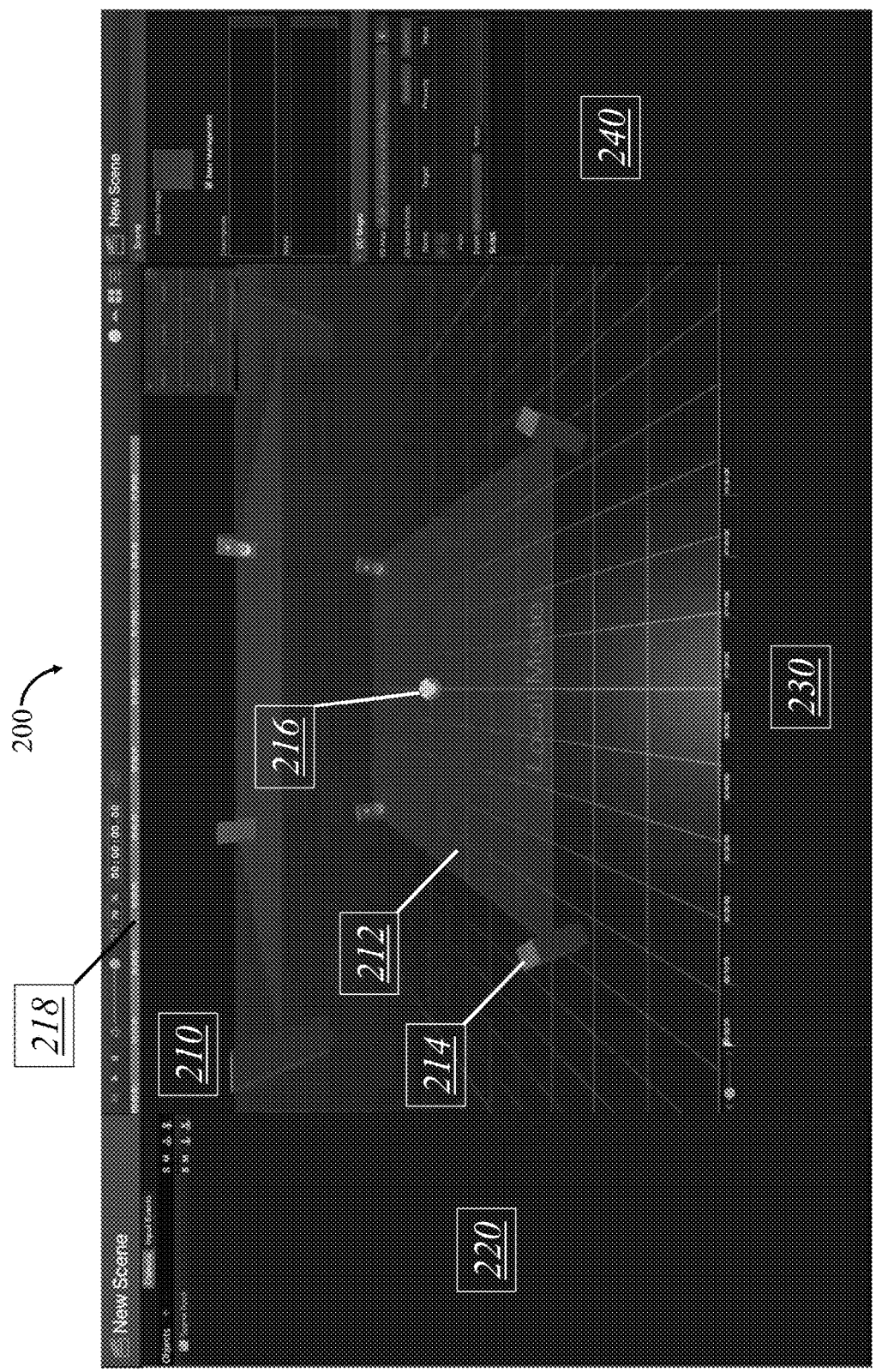
FIG. 2 illustrates an example of a graphical user interface (GUI) configured to display a first audio environment and an audio object within the first audio environment according to at least one embodiment of the present disclosure.

FIG. 2 illustrates an example of a GUI 200 configured to display a first virtual audio environment 212 ("audio environment 212") and an audio object 216 within the first audio environment 212 according to at least one embodiment of the present disclosure. In some embodiments, the GUI 200 may include a canvas 210 that visually displays one or more audio environments, such as the first audio environment 212. Each audio environment may be a virtual audio environment that may include a representation of one or more speakers 214. The representations of the speakers 214 may include relative positioning and/or orientation of speakers that may be disposed in a physical environment. In the present disclosure, reference to the "speakers 214" may include the corresponding visual representations depicted in the GUI 200 and/or physical speakers that correspond to the visual representations depicted in the GUI 200.

The audio object 216 may visually represent the audio that corresponds to the audio object 216 to be projected by the speakers 214 according to various properties, such as a pitch, rhythm, volume, etc., of the audio. Additionally or alternatively, reference to the audio object 216 may include audio files uploaded and/or selected by a user of the GUI 200, such as a song, a sound effect, a voice recording, etc. The audio object 216 may be positioned in a particular location within the first audio environment 212 to indicate that the speakers 214 should project audio having the properties described by the audio object 216 such that the audio object is perceived as being positioned at the particular location. In some embodiments, a particular audio environment including an audio object, such as the audio object 216, may represent a scene root associated with the particular audio environment in which the scene root provides a reference point at the center of the particular audio environment on which properties of one or more other audio objects may be based.

Figure 3:
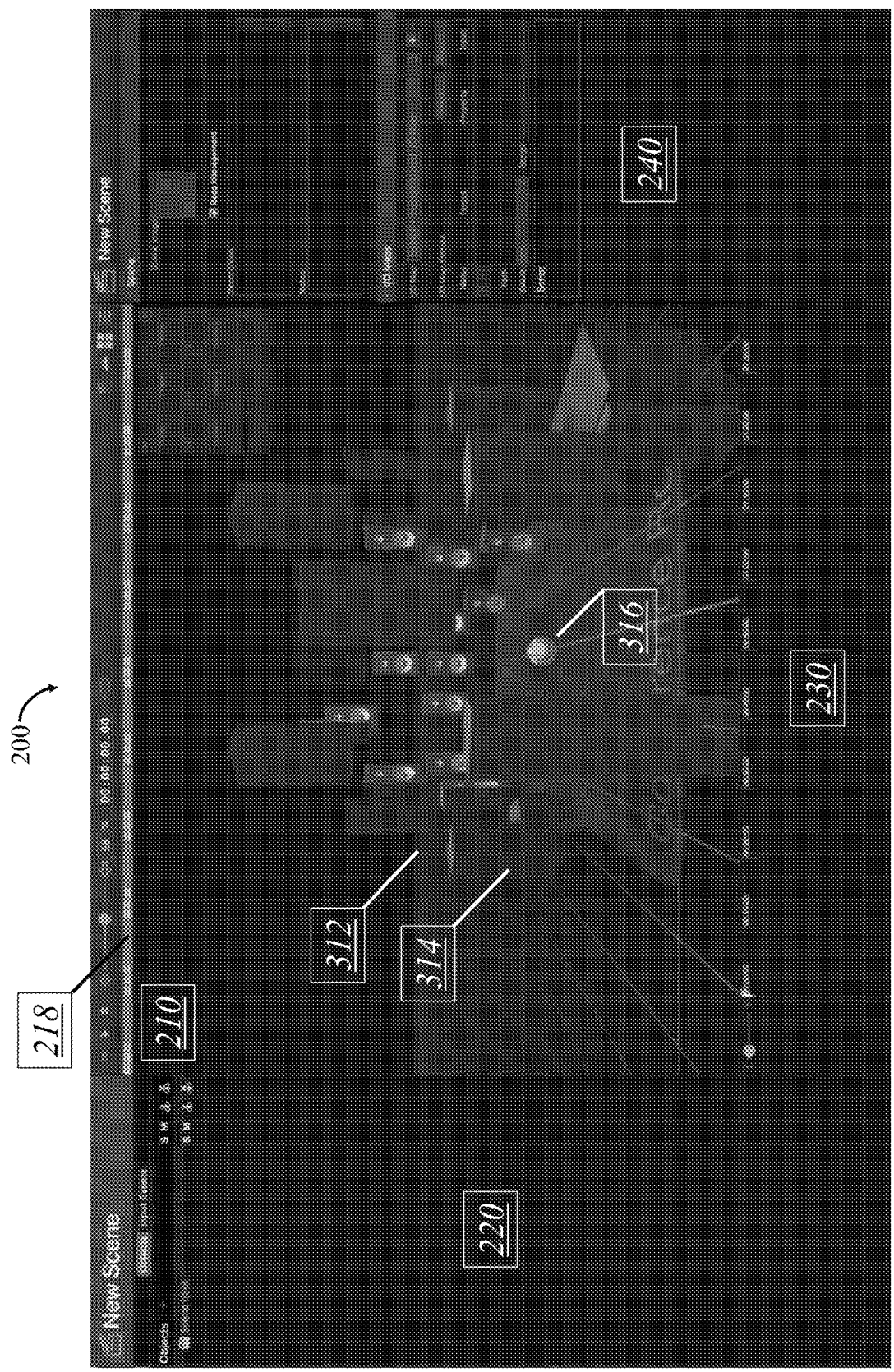
FIG. 3 illustrates a second audio environment displayed on the GUI according to at least one embodiment of the present disclosure that may be included as a second tab along the tabs bar.

In some embodiments, the GUI 200 may include a tabs bar 218 that labels multiple different audio environments displayed in the canvas 210. For example, FIG. 3 illustrates a second audio environment 312 displayed on the GUI 200 according to at least one embodiment of the present disclosure. The second audio environment that may be included in a second tab that is depicted along the tabs bar 218. The second audio environment 312 may include one or more speakers 314 and an audio object 316. The second audio environment 312 may include a different number and/or arrangement of speakers relative to the first audio environment 212 as illustrated in FIGS. 3 and 2, respectively. The second audio environment 312 may represent, for example, a movie theater that includes multiple speakers along each wall of the space, and the first audio environment 212 may represent, for example, a home theater that includes eight surround-sound speakers.

In this and other examples, the canvas 210 of the GUI 200 may allow the user to make modifications to the audio environments 212, 312. The user may specify a number of speakers, an orientation of each of the speakers, a type of each of the speakers, or any other characteristics relating to the speakers to be included in a particular audio environment. Although the speakers 314 of the second audio environment 312 may be arranged differently from the speakers 214 of the first audio environment 212, audio projected by the speakers 314 may result in the same or a similar listening experience as audio projected by the speakers 214 if the audio object 216 and the audio object 316 are specified to include the same or similar properties by the user.

In some embodiments, the first audio environment 212 may be displayed in the canvas 210 responsive to a first tab located along the tabs bar 218 being selected, and the second audio environment 312 may displayed in the canvas 210 responsive to a second tab located along the tabs bar 218 being selected. In these and other embodiments, each audio environment displayed with respect to each of the respective tabs may include audio objects that are independent of another such that a particular audio object does not affect audio objects included in other audio environments corresponding to the tabs of the tabs bar 218. Additionally or alternatively, a first audio object included in a first tab (e.g., the audio object 216 included in the first audio environment 212) may be copied and replicated as a second audio object included in a second tab (e.g., the audio object 316 included in the second audio environment 312).

Figure 4:
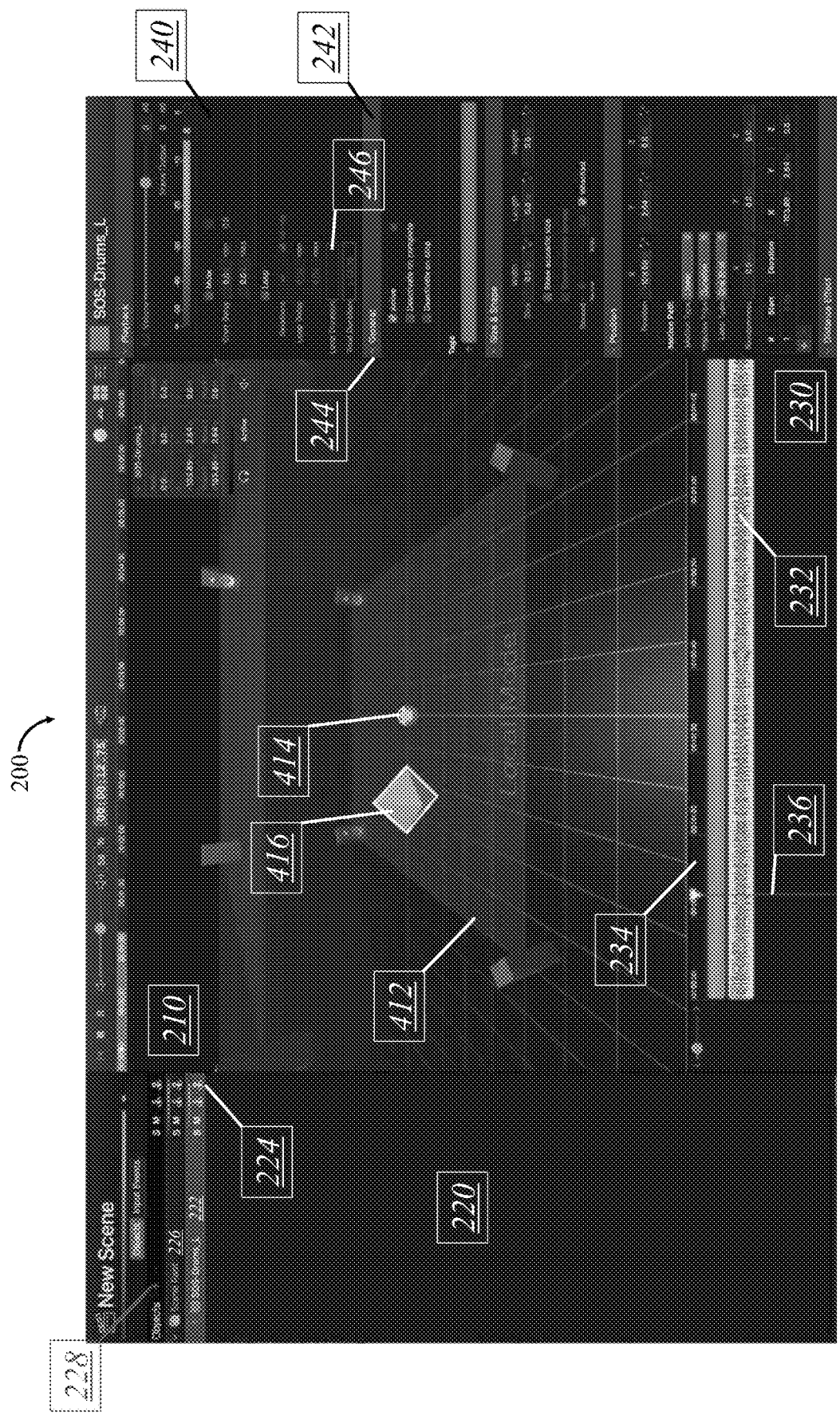
FIG. 4 illustrates an example of a third audio environment represented and displayed on the GUI to facilitate adjustment of one or more properties of an audio object using the object list, the timeline panel, and the object inspector in combination with the canvas according to at least one embodiment of the present disclosure.

In some embodiments, information about the audio object 216 and/or the audio object 316 may be displayed in more detail in an object list 220, a timeline panel 230, and/or an object inspector 240. FIG. 4 illustrates an example of a third audio environment 412 represented and displayed by the GUI 200 to facilitate adjustment of one or more properties of an audio object using the object list 220, the timeline panel 230, and the object inspector 240 in combination with the canvas 210 according to at least one embodiment of the present disclosure. The third audio environment 412 may include multiple audio objects, such as a first audio object 414 and a second audio object 416. A particular audio object may be selected by the user via the canvas 210 of the GUI 200 by clicking on the particular audio object, highlighting a particular area of the canvas, or any other ways of interacting with the GUI 200. In some embodiments, a selected audio object and an unselected audio object may be distinguished from one another by highlighting an outline of the selected audio object (as illustrated in FIG. 4 by the second audio object 416 versus the first audio object 414), marking the selected audio object, highlighting part of or all of the selected audio object, or applying any other selection features to the selected audio object without applying the selection features to the unselected audio object.

In some embodiments, the object list 220 may display each audio object included in the canvas 210 to provide an additional or an alternative way to interact with the audio objects visualized in the GUI 200. For example, the object list 220 may include one or more tiered rows 222 in which each row represents a particular audio object as illustrated in FIG. 4. As additional or alternative examples, the object list 220 may include a grid view in which each block in the grid view represents a particular audio object, a column view in which each column in the column view represents a particular audio object, a graphical view in which each node of a directed or an undirected graph represents a particular audio object, or any other ways of representing the audio objects displayed in the canvas 210. Additionally or alternatively, the object list 220 may include one or more options for affecting the display of the audio objects in the canvas 210. Each row 222 representing a particular audio object in a tiered row view may include an option 224 to, for example, hide the particular audio object, lock the particular audio object, make the particular audio object transparent, etc. User input relating to the option 224 may cause a corresponding change in the visualization of the particular audio object and any related audio objects in the canvas 210. For example, hiding the particular audio object via the option 224 in the object list 220 may hide the visualization of the particular audio object in the canvas 210.

Selection of the particular audio object in the canvas 210 may be reflected in the object list 220. As illustrated in FIG. 4, for example, selection of the second audio object 416 in the canvas 210 may highlight an outline of the second audio object 416, while a corresponding selection of the second audio object 416 in the object list 220 highlights the row 222 associated with the second audio object 416. By contrast, the first audio object 414 may be unselected, and a row 226 in the object list 220 may include a different color from the row 222 to indicate that the first audio object 414 is not selected. Selection of the first audio object 414 in the canvas 210 may highlight an outline of the first audio object 414 and cause the row 226 to change colors to match the color of the row 222. Correspondingly, deselection of the second audio object 416 in the canvas 210 may de-emphasize the outline of the second audio object 416 and cause the row 222 to change colors to match the color of the row 226. Additionally or alternatively, selection and/or deselection of the audio objects may be performed via the object list 220 so that selecting the row 222 and/or the row 226 (e.g., via clicking, double clicking, pressing a hotkey, or by any other selection method) may deselect and/or select the rows, respectively, and affect a corresponding change in the visual representations of the second audio object 416 and/or the first audio object 414, respectively, in the canvas 210.

Audio objects may be added to an audio scene via the object list 220. In some embodiments, the user may add new audio objects to the object list 220 using an object list menu 228. As illustrated in the object list 220 in FIG. 4, the object list menu 228 may be displayed as a row that is similar to the rows 222 and 226 and include one or more options similar to the option 224. For example, the object list menu 228 may include an option to add new audio objects to the object list 220, illustrated as a plus sign in FIG. 4. In this and other examples, the object list menu 228 may include options to remove existing audio objects from the object list 220, hide audio objects included in the object list 220, and/or any other options relating to the audio objects included in the object list 220.

Additionally or alternatively, audio objects may be added to and/or removed from the object list 220 without interacting with the object list menu 228. For example, the user may click on an existing row in the object list 220 and drag the row out of the object list 220 to remove the audio object corresponding to the row from the object list 220. As another example, the user may click on an icon relating to an audio file and drag the icon into the object list 220 to introduce a new audio object to the object list 220.

The timeline panel 230 may display a chronological representation of audio to be projected corresponding to a selected audio object. For example, a user may add a particular audio object, such as the first audio object 414, to the third audio environment 412 by selecting an audio file and adding the audio file to the third audio environment 412. In this and other examples, selecting and adding the audio file to a particular audio environment may include indicating via the GUI 200 that the user wants to add a new audio object and picking the audio file from a file management application (e.g., File Explorer for computers using a Windows operating system, Finder for computers using iOS, etc.). Additionally or alternatively, the audio file may be added to the particular audio environment by clicking and dragging the audio file from the file management application into the canvas 210 or by any other methods of picking a particular file for use in another application. In this and other examples, the audio file added to the third audio environment 412 as an audio object may include any audio files having any file format, such as .MP3, .MP4, .WAV, .M4A, .FLAC, etc.

In some embodiments, the audio object (e.g., the first audio object 414 as illustrated in FIG. 4) may be represented in the timeline panel 230 according to a visual representation of an audio signal 232 corresponding to the audio file. The visual representation of the audio signal 232 may indicate audio signal levels at different points of time in a particular audio file. Additionally or alternatively, the visual representation of the audio signal 232 may indicate a volume, a frequency, and/or any other properties of the audio signal corresponding to the particular audio file. In these and other embodiments, the timeline panel 230 may include one or more time benchmarks 234 that provide a frame of reference for playback of the audio file corresponding to a particular audio object. For example, a starting point of the playback of the audio file may be assigned as 00:00:00, and the time benchmarks 234 may provide checkpoints to facilitate indicating progression of the playback of the audio file. In this and other examples, the timeline panel 230 may include a marker 236 that visually indicates progression of the playback of the audio file.

The object inspector 240 may display a context-relevant, detailed view of one or more selected audio objects according to the properties of the selected audio objects. In some embodiments, the object inspector 240 may be divided into two or more sections by one or more headers 242. Each of the headers 242 may relate to one or more properties of the selected audio objects that are similar to each other in some way. For example, a first header may be "Playback", and the properties, "volume", "start delay", "loop delay", "loop duration", and "total duration", for example, may be included under the first header as illustrated in FIG. 4. As additional or alternative examples, the object inspector 240 may include headers 242 for "Size & Shape", "Position", "Distance Effects", and/or "General" properties of the selected audio objects.

The headers 242 may be collapsible, such as by clicking on a particular header, so that properties of the selected audio objects categorized under the particular header are hidden from view and/or properties categorized under other headers are more readily viewed by the user in the GUI 200. Collapsible headers may be indicated by a symbol 244 in the header, such as a downward-pointing arrow as illustrated in FIG. 4, an X-shape, or any other symbols, while collapsed headers may still be visible in the object inspector 240 and identified by a second symbol in place of the symbol 244, such as an upward-pointing arrow, an O-shape, or any other symbols.

Additionally or alternatively, the headers 242 may be rearranged by the user of the GUI 200, which may result in corresponding rearrangement of the properties of the selected audio objects included in the object inspector 240. For example, the user may click and drag, press one or more hotkeys, use a rearrangement menu (e.g., by right clicking a particular header), or interact with the headers 242 in any other ways to change an order in which the headers 242 are displayed in the object inspector 240. By rearranging the headers 242, particular properties of interest and/or disinterest to the user may be displayed more prominently and/or hidden from view, respectively.

In some embodiments, the object inspector 240 may include one or more input fields 246 that are configured to accept a text input and/or a numerical input from the user of the GUI 200. Additionally or alternatively, the input fields 246 of the object inspector 240 may include one or more drop-down menus, checkboxes, radio buttons, sliders, or any other forms of input with which the user of the GUI 200 may interact. Each of the input fields 246 may be associated with a respective property of the selected audio object, and the form of the input fields 246 may depend on the particular property with which the input field 246 is associated. For example, a volume of a particular selected audio object may be represented by a slider and/or an input textbox that accepts a numerical input. As additional or alternative examples, a size of the particular selected audio object may include arrows for incrementing a value of a width, a length, and/or a height of the particular selected audio object, and a motion path of the particular selected audio object may be selected from a drop-down menu including a list of possible motion paths as illustrated in FIG. 4.

In some embodiments, the user may select one or more particular audio objects using one or more of the canvas 210, the object list 220, the timeline panel 230, and/or the object inspector 240. The selection of the particular audio objects may be represented simultaneously by the canvas 210, the object list 220, the timeline panel 230, and/or the object inspector 240. Additionally or alternatively, modifying the particular audio objects via the canvas 210, the object list 220, the timeline panel 230, and/or the object inspector 240 may be simultaneously reflected in the other sections of the GUI 200.

Figure 5:
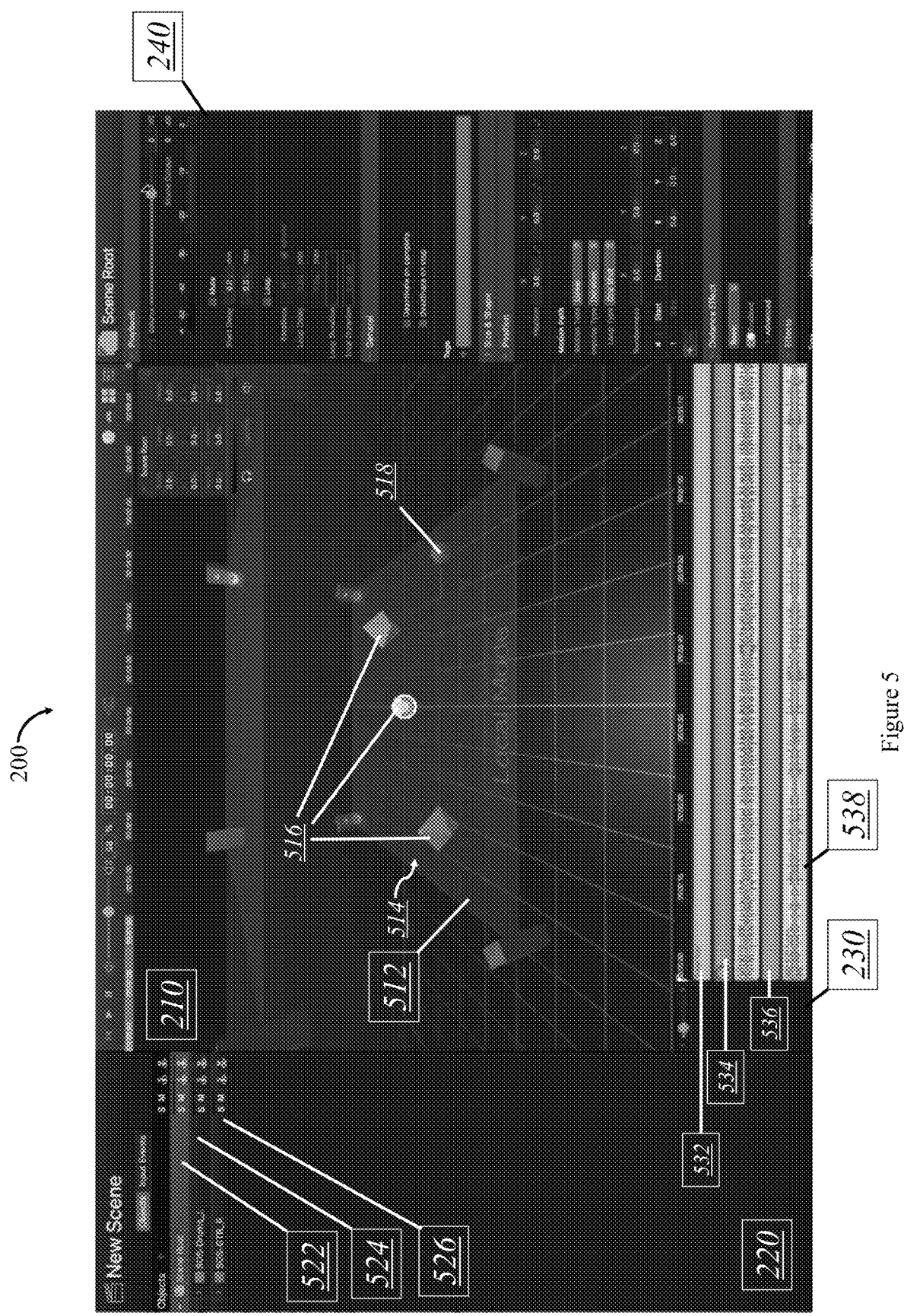
FIG. 5 illustrates the GUI configured to display and facilitate adjustment of multiple audio objects included in an audio environment according to at least one embodiment of the present disclosure.

For example, FIG. 5 illustrates the GUI 200 configured to display and facilitate adjustment of multiple audio objects 514 included in an audio environment 512 according to at least one embodiment of the present disclosure. The GUI 200 may display the canvas 210 modeling the audio environment 512 in which four audio objects 514 are configured. Three of the audio objects 514 may be included in a first group 516 of audio objects, and the fourth audio object may be included in a second group 518 of audio objects.

In some embodiments, the user may group the audio objects 514 via the canvas 210, the object list 220, the timeline panel 230, and/or the object inspector 240. Using the canvas 210, the user may select multiple pre-existing audio objects, such as by clicking the audio objects to be grouped, highlighting an area of the audio environment 512 that includes the audio objects to be grouped, clicking the audio objects to be grouped in conjunction with pressing a hotkey, or any other way of simultaneously selecting multiple objects via a GUI. Additionally or alternatively, the user may generate new audio objects that are automatically grouped with a particular audio object. For example, the user may select one of the audio objects included in the first group 516 and indicate (e.g., via a menu by right clicking the selected audio objects or via the object inspector 240) that a new audio object is to be generated as part of the same group as the selected audio objects.

Using the object list 220, the user may specify that one or more audio objects have a hierarchical or grouping relationship with one or more other audio objects. As illustrated in FIG. 5, for example, a first row 522 in the object list 220 may correspond to the audio object having a dodecahedron shape included in the first group 516. A second row 524 and a third row 526 in the object list 220 may each correspond to the audio objects having octahedron shapes included in the first group 516. In some embodiments, the user may specify one or more rows in the object list 220 as being related to and/or dependent on one or more other rows. As illustrated, the second row 524 and the third row 526 may each be indented relative to the first row 522 to indicate that the second row 524 and the third row 526 are dependent on the first row 522. The second row 524 and the third row 526 being dependent on the first row 522 may indicate that the corresponding audio objects have a hierarchical relationship in which changing properties of the audio object corresponding to the first row 522 may affect properties of the audio objects corresponding to the second row 524 and/or the third row 526 as described in further detail in relation to FIGS. 9A and 9B.

In these and other embodiments, grouping of the audio objects 514 included in the first group 516 may be reflected in the timeline panel 230 and/or the object inspector 240. The timeline panel 230 may display a first audio file representation 532, a second audio file representation 534, and a third audio file representation 536 corresponding to each of the audio objects 514 included in the first group 516 upon selection of any of the audio objects 514 included in the first group 516 via the canvas 210 and/or the object list 220. The audio objects corresponding to the audio file representations 532, 534, and 536 may be color coded, marked with a character or symbol, or identified in any other way to correspond with their counterparts in the canvas 210, the object list 220, and/or the object inspector 240. For example, the first audio file representation 532, the first row 522, and the dodecahedron-shaped audio object may each include a particular color to indicate that all three are representations of the same audio object.

One or more of the audio file representations 523, 534, and/or 536 may include an audio playback model 538. As illustrated in the timeline panel 230 in FIG. 5, the first audio file representation 532 does not include an audio playback model 538. In this and other examples, the first audio file representation 532 may not include a related audio file; instead, the first audio file representation 532 may represent a stock sound effect or a combination of other audio files in the same group. Additionally or alternatively, the audio playback model 538 associated with the first audio file representation 532 may be hidden (e.g., by the user). As illustrated in the timeline panel 230 in FIG. 5, the second audio file representation 534 and the third audio file representation 536 may each include audio playback models 538. The audio playback models 538 of the second audio file representation 534 and the third audio file representation 536 may be aligned in the timeline panel 230 by default such that the audio files corresponding to both of the audio file representations 534 and 536 simultaneously begin playback. Additionally or alternatively, the user may add a delay to one or both of the audio playback models 538 via the object inspector 240 so that the audio files corresponding to the audio file representations 534 and 536 begin playback at different times.

The object inspector 240 may display and facilitate modifying properties corresponding to each audio object 514 included in the first group 516. In some embodiments, the object inspector 240 may include headings corresponding to each audio object 514 included in the first group 516 so that the user may modify properties associated with each audio object 514 individually. Additionally or alternatively, the object inspector 240 may be configured to treat all of the audio objects 514 included in the same group (e.g., the first group 516) as a single audio object such that modifying the properties via the object inspector 240 causes corresponding changes to the properties of each audio object 514 included in the group. For example, the user inputting an adjustment to a position of the grouped audio objects via the object inspector 240 may affect a scaled position adjustment of each audio object 514 included in the group, which may or may not be based on the initial properties of the audio objects 514.

In some embodiments, the fourth audio object and any other audio objects included in the second group 518 may or may not be displayed in the object list 220, the timeline panel 230, and/or the object inspector 240 upon selection of the audio objects 514 included in the first group 516 in the canvas 210. In other words, the fourth audio object may be "hidden" until the first group 516 is deselected and/or the second group 518 is selected. As illustrated in FIG. 5, hiding of the second group 518 may be represented by adjusting an opacity of the audio objects 514 included in the second group 518. Additionally or alternatively, hiding the second group 518 may involve marking the audio objects 514 associated with the second group 518 with special characters, applying a particular color to the audio objects 514, or any other method of categorizing the audio objects 514 of the second group 518.

Additionally or alternatively, the audio objects 514 of the second group 518 may displayed in the object list 220, the timeline panel 230, and/or the object inspector 240 even when the second group 518 is not selected. In these and other embodiments, one or more rows in the object list 220, one or more audio file representations in the timeline panel 230, and/or one or more sections in the object inspector 240 may be displayed differently for audio objects included in a selected group versus an unselected group. For example, rows in the object list 220, audio file representations in the timeline panel 230, and/or sections in the object inspector 240 corresponding to an unselected group may be colored differently (e.g., grayed out) and/or more transparent than rows corresponding to a selected group. In these and other examples, the GUI 200 may or may not allow the user to modify or otherwise interact with the items associated with unselected audio objects.

Figure 6:
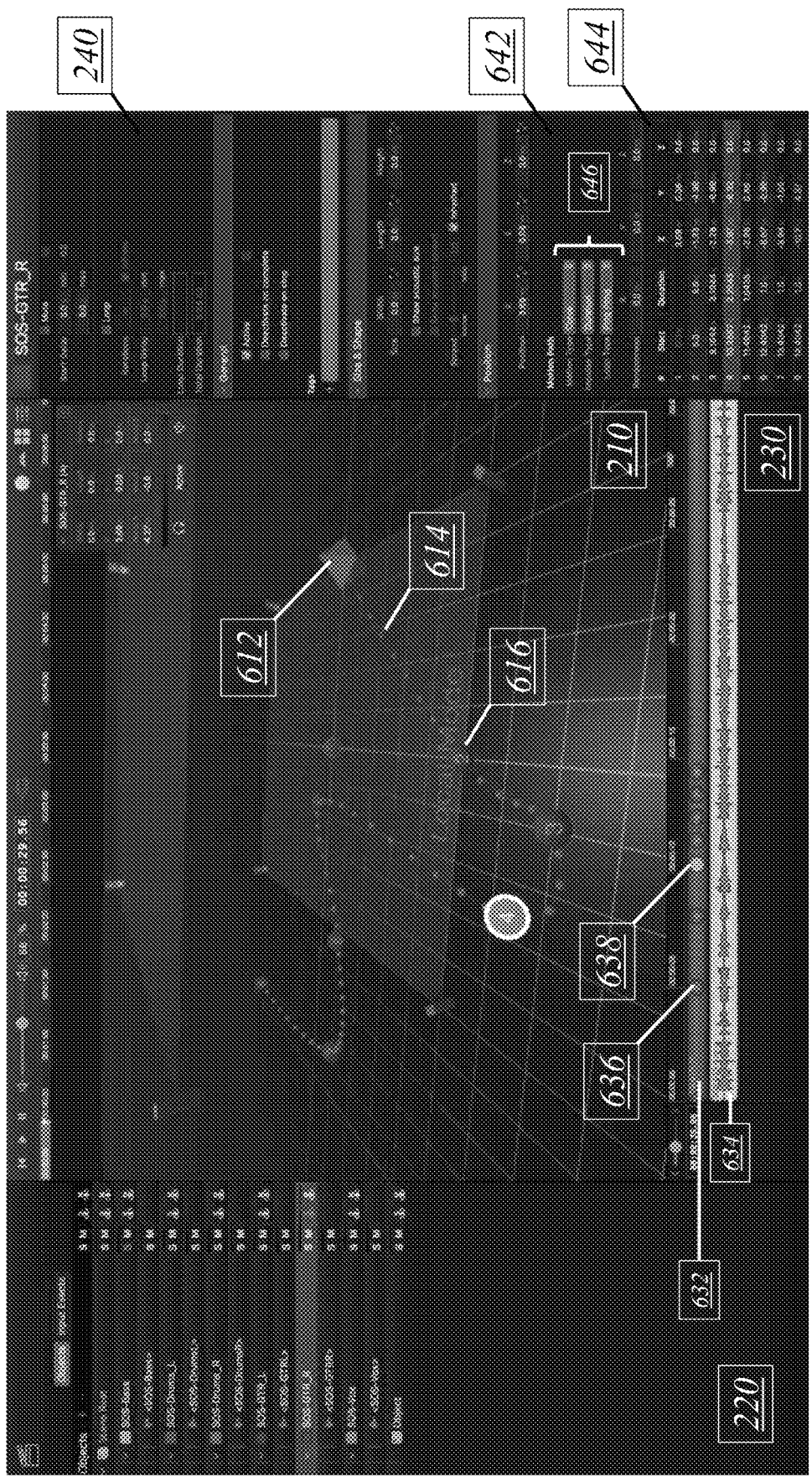
FIG. 6 illustrates an example audio environment displayed on the GUI in which the user may adjust the movement of an audio object according to at least one embodiment of the present disclosure.

In some embodiments, the user may specify movement for one or more audio objects displayed by the GUI 200. FIG. 6 illustrates an example audio environment displayed on the GUI 200 in which the user may adjust the movement of an audio object 612, according to at least one embodiment of the present disclosure. In some embodiments, the user may specify movement of the audio object 612 via the canvas 210. In these and other embodiments, descriptions of "movement" of the audio object 612 may refer to changes in the perceived directionality of a particular audio object by a human situated in a physical space corresponding to and represented by an audio environment that includes the audio object 612. In a two-speaker stereo system, for example, a particular audio object may be perceived as moving from a starting point to the left of a human listener to an ending point to the right of the human listener by gradually decreasing a first volume associated with a first speaker positioned to the left of the human listener while increasing a second volume associated with a second speaker positioned to the right of the human listener.

The movement of the audio object 612 may be visualized by a path made of one or more checkpoints 616 in which the audio object 612 moves towards each of the checkpoints 616 according to one or more path markers 614 between the checkpoints 616. In these and other embodiments, the user may specify movement for the audio object 612 by defining positions and an order of the checkpoints 616, and a corresponding path as visualized by the path markers 614 may be automatically generated (such as by the audio computation module 120 as described in FIG. 1) and displayed by the GUI 200. Additionally or alternatively, the user may specify the movement for the audio object 612 by defining the path of the audio object 612, and corresponding checkpoints 616 and path markers 614 may be automatically generated and displayed by the GUI 200. The user may define the checkpoints 616 and/or the path of the audio object 612 by selecting the audio object 612 and, for example, dragging the selected audio object 612 along a movement path specified by the user, clicking particular locations in the audio environment, pressing keys and/or hotkeys to define the movement path, or some combination thereof.

The checkpoints 616 may facilitate visualization of movement of a corresponding audio object and represent proxy positions and/or velocities of the corresponding audio object along a movement path. In some embodiments, the user may set the locations of the checkpoints 616 and specify one or more properties of the corresponding audio object at the checkpoints 616 such that the corresponding audio object is modified during movement of the corresponding audio object. For example, the user may specify that a particular audio object moves towards and arrives at a first checkpoint in five seconds and stays at the location of the first checkpoint for two seconds. The user may specify that a volume of the particular audio object decreases by fifty percent during the five seconds of movement towards the first checkpoint and increases by twenty percent while located at the first checkpoint. The user may then specify that the particular audio object moves towards a second checkpoint over a ten-second period and remains stationary for three seconds before moving to a third and final checkpoint over a six-second period. In this and other examples, the user may further specify that the particular audio object remains at the third checkpoint for a five-second period before moving back towards an initial position of the particular audio object along the same movement path with the same timings (i.e., ping pong looping behavior). Additionally or alternatively, the user may specify that the particular audio object immediately returns to its initial position after reaching the third checkpoint and remaining at the third checkpoint for a particular period of time and repeating the movement path (i.e., repeat-from-start looping behavior).

In these and other embodiments, the path markers 614 may be automatically generated based on properties relating to the audio object 612 and/or the checkpoints 616. Returning to the previous example, the user specifying that the particular audio object moves towards the first checkpoint in five seconds may result in a visualization that includes a first number of evenly spaced path markers 614 between the initial position of the particular audio object and the first checkpoint. The user decreasing the time of movement of the particular audio object from the initial position to the first checkpoint may increase the number of path markers 614 between the initial position of the particular audio object and the first checkpoint to visually indicate a velocity of the particular audio object has increased. Conversely, increasing the time to move to the first checkpoint may decrease the number of path markers 614 to visually indicate a decreased velocity of the particular audio object. Additionally or alternatively, an increased number of path markers 614 may indicate a velocity decrease and/or a decreased number of path markers 614 may indicate a velocity increase.

Additionally or alternatively, the path markers 614 may be adjusted by the user in the canvas 210 and/or the object inspector 240. For example, the user may click on a particular path marker in the canvas 210 and drag the path marker to adjust a trajectory of a corresponding audio object with or without changing other properties of the movement path (e.g., the duration of travel towards the checkpoint 616). As another example, the user may select a shape of the movement path (e.g., linear, parabolic, zigzag, etc.) in the object inspector 240.

Specification of one or more properties of the audio object 612 and/or the checkpoints 616 may be affected in the canvas 210 and/or the object inspector 240. In the canvas 210, the user may, for example, select the audio object 612 and dragging the selected audio object 612 along a movement path specified by the user such that changes in direction in the movement path are automatically identified as the checkpoints 616. As another example, the user may click on particular locations in the audio environment after selecting the audio object 612 to define the checkpoints 616, press keys and/or hotkeys to define the checkpoints 616, or some combination thereof. In the object inspector 240, the user may modify properties relating to the audio object 612 using a position section 642, a table 644, and/or a motion section 646 of the object inspector 240 as described in further detail below.

The movement path of the audio object 612 as specified by the user via the canvas 210 may be reflected in the object list 220, the timeline panel 230, and/or the object inspector 240 and vice versa (i.e., user inputs relating to audio object movement via the object list 220, the timeline panel 230, and/or the object inspector 240 may be reflected in the canvas 210).

In some embodiments, specifying and/or modifying the movement path of a particular audio object, such as the audio object 612, may involve modifying spatial properties, temporal properties, or a combination thereof. The spatial properties of the particular audio object may include, for example, the position and/or the movement path of the particular audio object, and the temporal properties of the particular audio object may include, for example, a duration relating to one or more movements and/or a looping behavior of the particular audio object (e.g., single-pass, ping pong looping, repeat-from-start looping, etc.).

To visually represent the spatial and the temporal properties of the particular audio object to the user via the GUI 200, movement specified by the user via the canvas 210 may be reflected in the timeline panel 230, and the movement of the particular audio object may be visually indicated by the timeline panel 230. The movement of the particular audio object may represent playing an audio file associated with the particular audio object in which a sound source of the audio file being played moves within the audio environment corresponding to the path markers 614. The timeline panel 230 may display a checkpoint timeline 632 coordinated with a visual representation of the audio file 634 corresponding to the particular audio object.

As illustrated in FIG. 6, the checkpoint timeline 632 may include one or more markers 636 that correspond to the checkpoints 616 displayed in the canvas 210 for the same audio object 612, which provides the user with a visualization of how the audio object 612 may sound over the course of its playback. In these and other embodiments, the checkpoint timeline 632 may include a playback marker 638 that indicates progression of playback of the particular audio object. The user may interact with the playback marker 638, such as by clicking, clicking and dragging, or pressing a particular hotkey, to begin playback of the audio file corresponding to the particular audio object at a particular point in the progression of the audio file. Additionally or alternatively, the user may interact with and adjust the markers 636 to change timings with which the particular audio object moves to the checkpoints 616 corresponding to the adjusted markers 636. Changes to the timings between the markers 636 may be visually represented in the canvas 210 by changing a number of and/or a spacing between the path markers 614. The changes to the timings between the markers 636 may additionally or alternatively be represented in the object inspector 240 as described in further detail below.

In some embodiments, movement specified by the user via the canvas 210 may be reflected in the object inspector 240. The movement of a particular audio object may be specified by the user in the object inspector 240, such as in the position section 642 specifying one or more positions of the particular audio object. As illustrated in FIG. 6, for example, the position section 642 may include the table 644 indicating positions and timings corresponding to each of the checkpoints 616, and the motion section 646 that specifies a movement behavior of the audio object 612 between the checkpoints 616. The motion section 646, as illustrated, specifies the movement behavior of the audio object 612 at a fourth checkpoint because a row of the table 644 corresponding to the fourth checkpoint is highlighted.

In these and other embodiments, the object inspector 640 may automatically determine (i.e., the audio computation module 120 may perform computations to determine) the positions and timings of the checkpoints 616 to populate the table 644 and/or the movement behavior of a particular audio object to populate the motion section 646 based on user inputs to the canvas 210 involving movement of the particular audio object. Additionally or alternatively, the object inspector 240 may automatically determine the positions and timings of the checkpoints 616 and/or the movement behavior of the particular audio object based on user inputs to the timeline panel 230. Additionally or alternatively, the user may provide input to the object inspector 240, such as editing information included in the table 644 and/or the movement section 646, and corresponding visual representations of the particular audio object displayed in the canvas 210 and/or the timeline panel 230 may be generated and/or updated.

Figure 7:
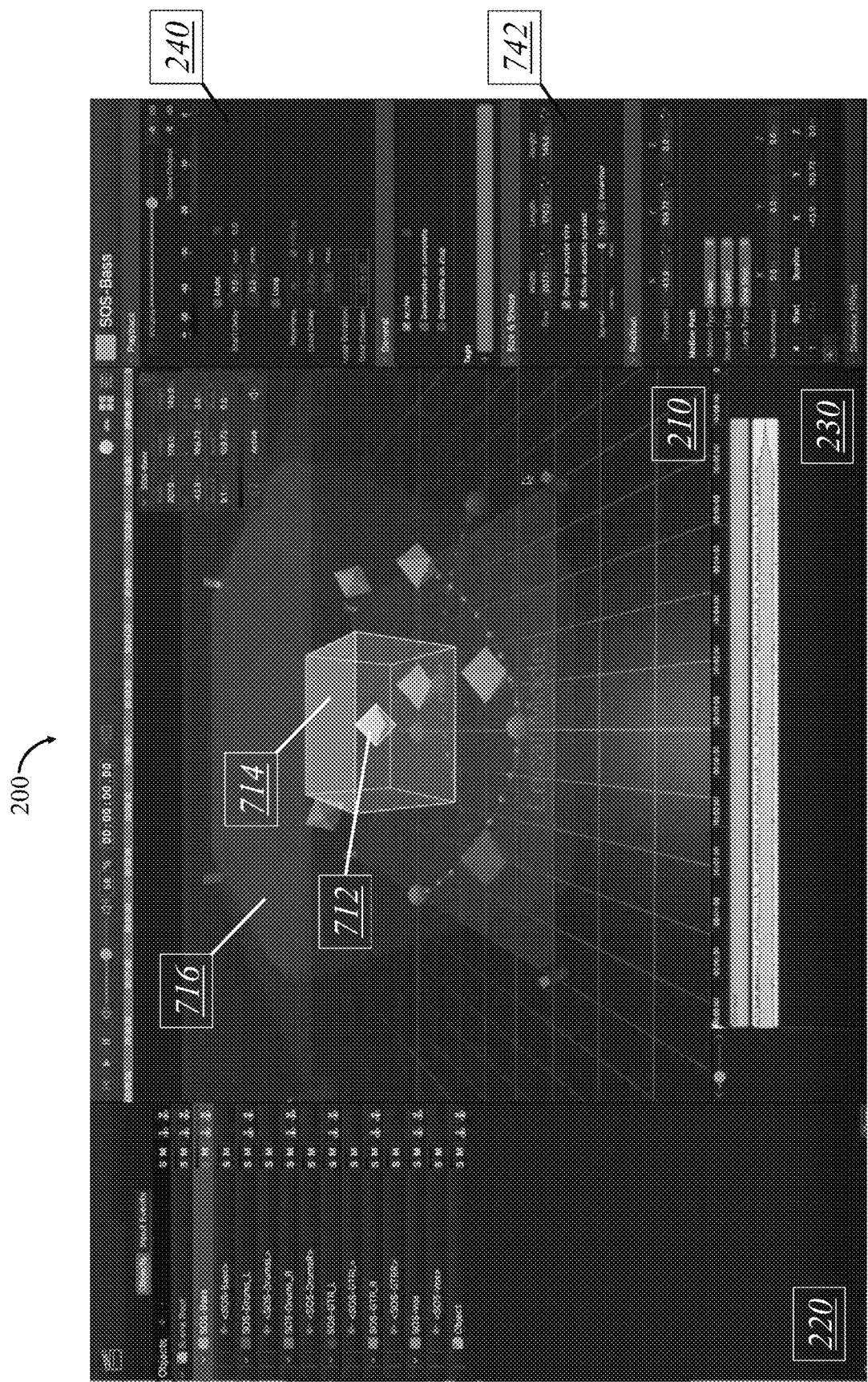
FIG. 7 illustrates an example of the GUI being configured to display a size and a spread corresponding to an audio object according to at least one embodiment of the present disclosure.

In some embodiments, properties of audio objects relating to volume, size, and/or spread of audio objects may be visually represented and modified via the GUI 200. FIG. 7 illustrates an example of the GUI 200 being configured to display a size 714 and a spread 716 corresponding to an audio object 712 according to at least one embodiment of the present disclosure. The size 714 of the audio object may represent a distance to which sound associated with the audio object 712 is intended to project, and the spread 716 may represent a rate of sound falloff beginning from the size boundaries.

The user may select the audio object 712 and perform one or more user inputs corresponding to modifying the size 714 of the audio object 712 in the GUI 200 to specify the size 714 of the audio object 712 in the canvas 210. For example, the user may click on the selected audio object 712 and drag the audio object 712 to a specified size 714. As another example, the user may press a hotkey and a location in the audio environment displayed in the canvas 210 to specify a boundary of the size 714; the user may then click on space included in the size 714 and/or use one or more keys to rotate, resize, or otherwise modify the size 714 of the audio object 712. In these and other examples, the GUI 200 may display the size 714 in the same or a similar color, using the same or a similar marking, and/or with the same or a similar outline as the audio object 712 to indicate that the size 714 is associated with the audio object 712.

In these and other embodiments, the spread 716 may be computed, such as by the audio computation module 120 as described in FIG. 1, based on the size 714 specified by the user. In other words, the user may not specify the spread 716 because the spread 716 is automatically generated based on properties of the audio object 712 and/or the size 714. Additionally or alternatively, the user may specify or control the spread 716 of the audio object 712 in the same or a similar way as specifying or controlling the size 714 of the audio object 712, and a corresponding size 714 may be automatically determined and displayed in the canvas 210.

Additionally or alternatively, the user may modify the size 714 and/or the spread 716 being displayed in the canvas 210 using the object inspector 240. The object inspector 240 may include a "Size & Shape" section 742 that relates to modifying the size 714 and/or the spread 716 as illustrated in FIG. 7. In some embodiments, the user may specify whether to display the size 714 and/or the spread 716 in the canvas 210 using the "Size & Shape" section 742. Additionally or alternatively, the user may specify dimensions of the size 714, a scale of the spread 716, and/or any other properties relating to the size 714 and/or the spread 716.

The canvas 210 may visually represent an audio object, such as the audio object 712, with a corresponding size and spread based on the user's inputs and/or computations of an associated computer system. In some embodiments, the audio object 712 may be visually represented by boundaries and an opacity of the audio object 712 itself. The boundaries of the audio object 712, and correspondingly a magnitude of the audio object 712, may be visually represented to be proportional to the volume of the audio object 712. For example, a first particular audio object having a greater audio volume than a second particular audio object may be visually represented as being larger than the second particular audio object in the canvas 210. Additionally or alternatively, the magnitudes of the audio objects may be visually represented independent of the audio objects' volumes; instead, a color, a pattern, a marking, or any other visual indication may be used to represent varying volumes between the audio objects. For example, audio objects having lower volumes (i.e., softer audio objects) may include cooler colors, such as blue, purple, or green, while audio objects having greater volumes (i.e., louder audio objects) may include warmer colors, such as yellow, orange, or red.

The size 714 and/or the spread 716 of the audio object 712 may be visually represented in a way that is related to visual representation of the audio object 712 itself. As illustrated in FIG. 7, for example, the size 714 may be visually represented by a rectangular box corresponding to the user-defined and/or automatically defined size 714 of the audio object 712. The spread 716 may be visually represented by a second, larger shape corresponding to the user-defined and/or automatically defined spread 716. In some embodiments, the size 714 and/or the spread 716 may be displayed in the same or a similar color as the audio object 712 to which the size 714 and the spread 716 correspond to visually indicate that the audio object 712, the size 714, and the spread 716 are related to one another.

In these and other embodiments, the size 714 and/or the spread 716 may include lower opacity relative to the audio object 712 to facilitate visual recognition of the boundaries between the audio object 712, the size 714, and the spread 716. For example, the size 714 may be visually represented using a more transparent shape than the audio object 712, and the spread 716 may be visually represented using a more transparent shape than the size 714. Additionally or alternatively, the size 714 and/or the spread 716 may be visually represented using different shades of the color of the audio object 712. For example, the audio object 712 may be displayed in the color blue in the canvas 210; the size 714 may include a lighter shade of blue than the audio object 712, and the spread 716 may include a lighter shade of blue than the size 714. Additionally or alternatively, the size 714 and/or the spread 716 may be visually represented using different fill-in patterns. For example, the audio object 712 may be displayed with a solid color gradient, while the size 714 and the spread 716 each includes a first pattern and a second pattern, respectively, within some or all of the size 714 (e.g., a cross-hatch pattern, diagonal lines, etc.).

Figure 8A:
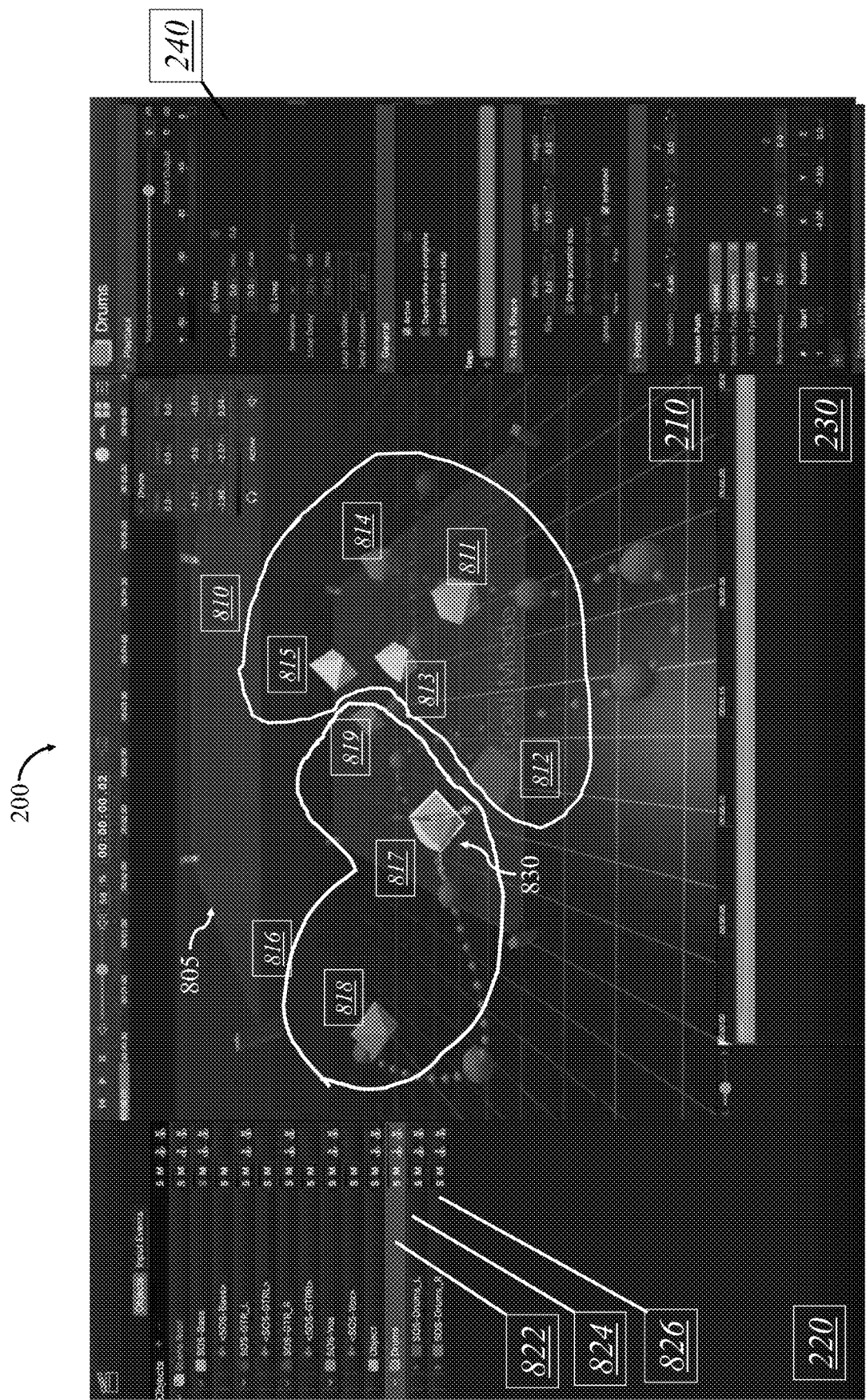
FIGS. 8A and 8B illustrates an example of the GUI displaying grouping of one or more audio objects and rotation of the orientations of the grouped audio objects according to at least one embodiment of the present disclosure.
Figure 8B:
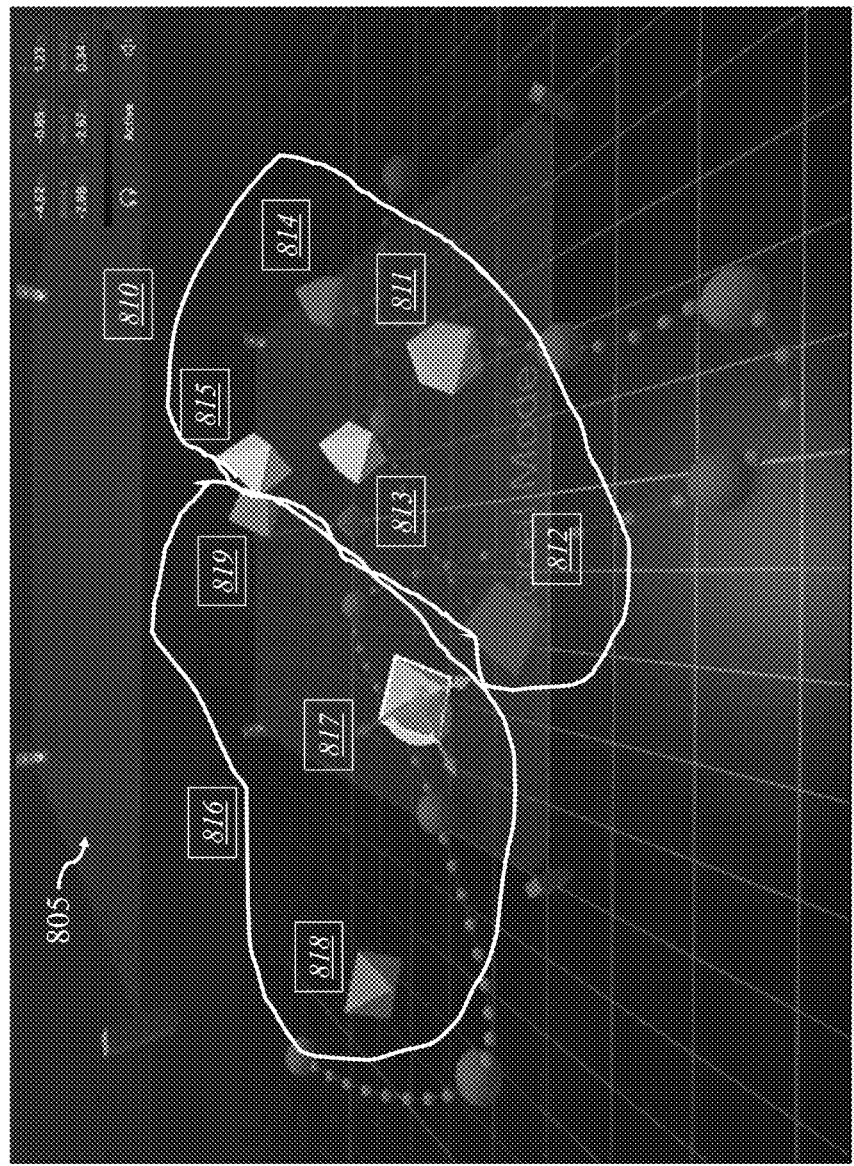

In some embodiments, an orientation of audio objects may be visually represented and rotated via the GUI 200. FIGS. 8A and 8B illustrates an example of the GUI 200 displaying grouping of one or more audio objects and rotation of the orientations of the grouped audio objects according to at least one embodiment of the present disclosure. An audio environment 805 may include audio objects 811, 812, 813, 814, 815, 817, 818, and 819. The audio objects 811-815 may be grouped in a first group 810, and the audio objects 817-819 may be grouped in a second group 816.

The user may select one or more of the audio objects, such as the audio object 817 as illustrated in FIGS. 8A and 8B, and indicate by the user's input to rotate the audio objects. In some embodiments, the user may indicate that a particular audio object is to be rotated via the canvas 210 by accessing a menu (e.g., a right-click menu), pressing a hotkey after selecting the particular audio object, or any other method. After indicating that the particular audio object is to be rotated, the canvas 210 may display axes 830 overlaid on top, above, below, or otherwise in the vicinity of the particular audio object in which each of the axes 830 may be involved with a pitch, a roll, and/or a yaw of the particular audio object. The user may click and drag one or more of the axes 830 to cause the particular audio object to rotate. Additionally or alternatively, indicating that the particular audio object should be rotated may cause the canvas 210 to display a rotation menu through which the user may input rotation parameters for the particular audio object. The rotation menu may, additionally or alternatively, be accessed through the object list 220, the timeline panel 230, and/or the object inspector 240. For example, the rotation menu may be a section or part of a section included in the object inspector 240.

In some embodiments, rotation of an audio object may affect rotation of one or more audio objects that are grouped with or dependent on the rotated audio object. As illustrated in the object list 820 of the GUI 200 in FIG. 8A, a first row 822 in the object list 820 may relate to the audio object 817. A second row 824 and a third row 826 may relate to the audio object 818 and the audio object 819, respectively, and the audio objects 818 and 819 may depend on the audio object 817 in a hierarchical relationship as denoted by the indentations in the second row 824 and the third row 826. Rotation of the audio object 817, as illustrated in the canvas 210 in FIG. 8B, may cause rotation of the audio objects 818 and 819. For example, rotating the audio object 817 by adjusting the roll of the audio object 817 may cause the roll of the audio object 818 and/or the audio object 819 to be adjusted by the same or a similar degree of tilt. Additionally or alternatively, adjusting the roll of the audio object 817 may cause the roll of the audio object 818 and/or the audio object 819 to be adjusted by a proportional tilt angle that is scaled according to the tilt angle of the audio object 817.

In these and other embodiments, rotating one or more audio objects may affect properties of the audio objects, such as location and/or position-related properties. For example, a size of a particular audio object may be reoriented based on rotation of the particular audio object such that the size and/or the spread of the particular audio object reaches different areas within an audio scene relative to the original, unrotated particular audio object. As another example, a movement path of a particular audio object may be recomputed and visually represented in the canvas 210 according to a degree of rotation of the particular audio object.

Through at least the canvas 210, the object list 220, the timeline panel 230, and/or the object inspector 240, the GUI 200 may assist the user in configuring and editing an audio scene. The GUI 200 may provide visualizations of the audio scene that are updated in real-time based on inputs from the user so that the user may better understand and organize audio objects included in the audio scene. For example, as described above in relation to FIGS. 2-8B, the GUI 200 may facilitate visualization and user modification of the audio scene with respect to at least positioning of audio objects within the audio scene, synchronization of audio playback involving one or more audio objects, definition and adjustment of moving audio objects, and overlapping and/or interaction between sizes and/or spreads of one or more audio objects.

In some embodiments, the GUI 200, including the canvas 210, the object list 220, the timeline panel 230, and/or the object inspector 240, may be arranged differently from the designations of the GUI 200 shown in FIGS. 2-8B. Modifications, additions, or omissions may be made to the GUI 200 without departing from the scope of the present disclosure. For example, the canvas 210, the object list 220, the timeline panel 230, and/or the object inspector 240 may include any number of other visualizations or visualizations in different configurations than as shown in FIGS. 2-8B.

Figure 9:
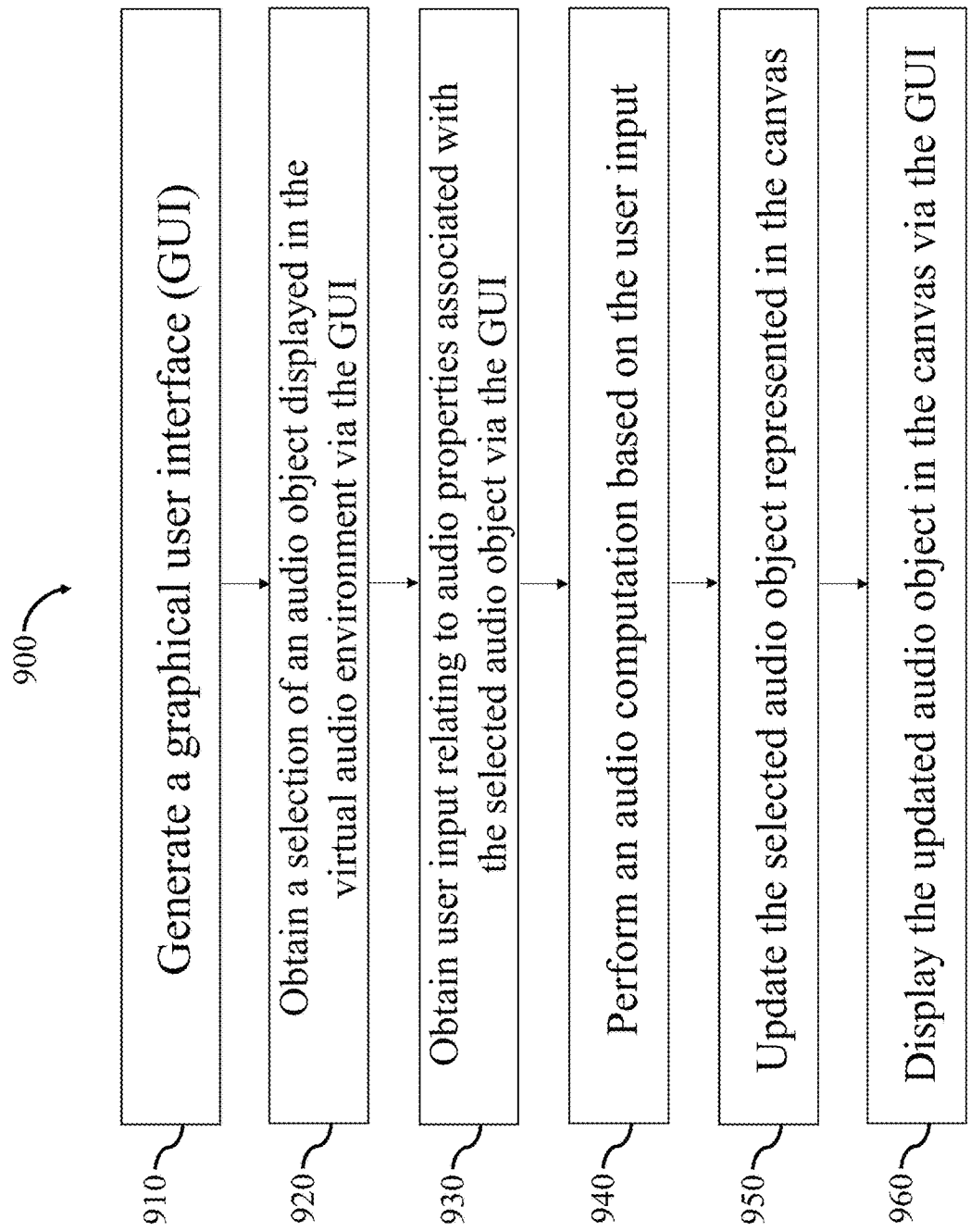
FIG. 9 is a flowchart of an example method of generating and displaying audio objects according to one or more embodiments of the present disclosure.

FIG. 9 is a flowchart of an example method 900 of generating and displaying audio objects according to one or more embodiments of the present disclosure. The method 900 may be performed by any suitable system, apparatus, or device. For example, the audio computation module 120 or the GUI module 130 may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

The method 900 may begin at block 910, where a GUI is generated. In some embodiments, the GUI may include a canvas, such as the canvas 210, that visually displays a virtual audio environment representing an arrangement of one or more speakers in a real-world audio environment. The virtual audio environment may depict one or more audio objects in which a particular audio object represents one or more sounds that are grouped together to provide a particular sound effect. In some embodiments, the GUI may include an object list that displays the audio objects included in the virtual audio environment as a list, such as the object list 220, and/or a timeline panel that visually represents playback of the audio signals, such as the timeline panel 230, in which a respective audio signal may correspond to a respective audio object included in the virtual audio environment. In some embodiments, the GUI may include an object inspector that displays the audio properties associated with the audio objects.

At block 920, a selection of an audio object displayed in the virtual audio environment may be obtained via the GUI. In some embodiments, the selection of the audio object may be a selection of a group of audio objects. The selection of the audio object may be performed via a user selection input on the canvas, the object list, the timeline panel, or the object inspector, and the selection of the audio object may then be reflected on the canvas, the object list, the timeline panel, and the object inspector.

At block 930, user input relating to audio properties associated with the selected audio object may be obtained via the GUI. The user input may relate to modifying one or more parameters associated with the audio properties of the audio objects, such as a volume, position, orientation, grouping, size, spread, and/or movement of the audio objects as described in relation to FIGS. 2-8B. In some embodiments, the user input relating to the audio properties associated with the selected audio object may involve hiding the selected audio object in which hiding the selected audio object includes removing the selected audio object from being visually displayed or changing an opacity of the selected audio object in the canvas, the object list, the timeline panel, or the object inspector.

In these and other embodiments, the user input may or may not refer to user commands made directly in the virtual environment of the GUI. As described in relation to FIG. 1, the user input may include an input made by a computer system that affects a particular audio scene and/or any audio objects included in the particular audio scene.

At block 940, an audio computation may be performed based on the user input and one or more parameters associated with the audio objects.

At block 950, the audio objects displayed in the GUI may be updated according to the audio computation. In some embodiments, the user may interact with the updated audio objects displayed in the GUI such that further user input may be obtained, and the audio objects may be further updated based on additional audio computations.

At block 960, the updated audio object may be displayed in the canvas via the GUI.

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

Figure 10:
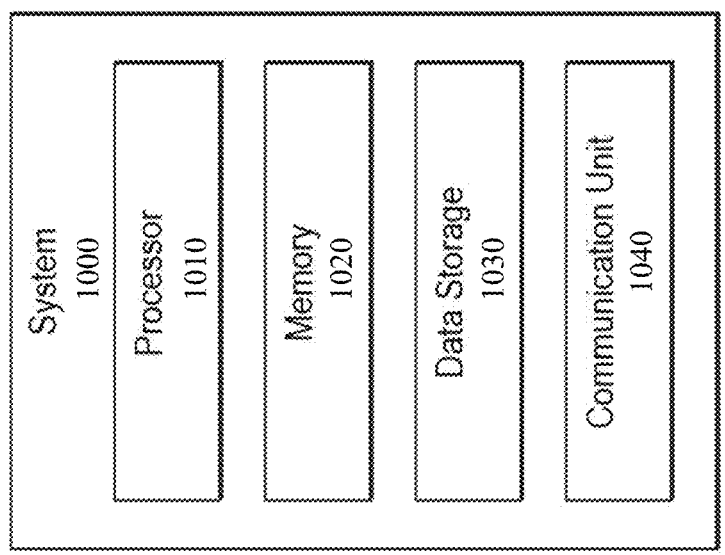
FIG. 10 is an example computing system.

FIG. 10 is an example computing system 1000, according to at least one embodiment described in the present disclosure. The computing system 1000 may include a processor 1010, a memory 1020, a data storage 1030, and/or a communication unit 1040, which all may be communicatively coupled. Any or all of the system 100 of FIG. 1 may be implemented as a computing system consistent with the computing system 1000.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to cause the computing system 1000 to perform the operations of the method 900 of FIG. 9. For example, the computing system 1000 may execute the program instructions to obtain user input relating to audio objects displayed in a GUI, perform an audio computation based on the user input and parameters associated with the audio objects, and update the audio objects displayed in the GUI according to the audio computation.

The memory 1020 and the data storage 1030 may include computer-readable storage media or one or more computer-readable storage mediums for having computer-executable instructions or data structures stored thereon. Such computer-readable storage media may be any available media that may be accessed by a general-purpose or special-purpose computer, such as the processor 1010. For example, the memory 1020 and/or the data storage 1030 may include the user input 110, the audio object computation results 125, or the GUI 135 of FIG. 1. In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a particular operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system, comprising:
one or more processors; and
one or more non-transitory computer-readable storage media configured to store instructions that, in response to being executed, cause the system to perform operations, the operations comprising:
  generating a graphical user interface (GUI) that includes a canvas visually displaying a virtual audio environment that represents an arrangement of one or more speakers in a real-world audio environment, the virtual audio environment including a plurality of audio objects in which an audio object represents one or more sounds that are grouped together to provide a particular sound effect;
  obtaining, via the GUI, a selection of an audio object displayed in the virtual audio environment;
  obtaining, via the GUI, user input relating to audio properties associated with the selected audio object;
  performing an audio computation based on the user input;
  updating the selected audio object represented in the canvas; and
  displaying, via the GUI, the updated audio object in the canvas.

2. The system of claim 1, wherein an audio object of the plurality of audio objects is designated as a scene root audio object that provides a reference point at the center of the virtual audio environment on which the audio properties of one or more other audio objects are based.

3. The system of claim 1, wherein the selection of the audio object is a selection of a group of audio objects.

4. The system of claim 1, wherein the user input relating to the audio properties associated with the selected audio object includes specifying a hierarchical relationship between a first audio object and a second audio object, the hierarchical relationship indicating that updating first audio properties associated with the first audio object affects second audio properties associated with the second audio object.

5. The system of claim 1, wherein the GUI further includes:
  an object list that displays the plurality of audio objects included in the virtual audio environment as a list;
  a timeline panel that visually represents playback of a plurality of audio signals, a respective audio signal corresponding to a respective audio object of the plurality of audio objects included in the virtual audio environment; and
  an object inspector that displays the audio properties associated with the plurality of audio objects.

6. The system of claim 5, wherein the selection of the audio object is performed via a user selection input on the canvas, the object list, the timeline panel, or the object inspector, and the selection of the audio object is reflected on the canvas, the object list, the timeline panel, and the object inspector.

7. The system of claim 5, wherein the user input relating to the audio properties associated with the selected audio object involves hiding the selected audio object, the hiding the selected audio object including removing the selected audio object from being visually displayed or changing an opacity of the selected audio object in the canvas, the object list, the timeline panel, or the object inspector.

8. The system of claim 5, wherein a volume, a size, or a spread of a particular audio object is visually represented in the canvas, the object list, the timeline panel, or the object inspector.

9. The system of claim 1, wherein the user input relating to the audio properties associated with the selected audio object involves specifying a movement of the selected audio object, the movement of the selected audio object representing changes in a perceived directionality of the selected audio object by a human situated in a physical space corresponding to and represented by the virtual audio environment.

10. The system of claim 9, wherein specifying the movement of the selected audio object includes specifying one or more checkpoints to which the selected audio object is directed to move or a time taken for the selected audio object to move from a first checkpoint to a second checkpoint.

11. A method, comprising:
  generating a graphical user interface (GUI) that includes a canvas visually displaying a virtual audio environment that represents an arrangement of one or more speakers in a real-world audio environment, the virtual audio environment including a plurality of audio objects in which an audio object represents one or more sounds that are grouped together to provide a particular sound effect;
  obtaining, via the GUI, a selection of an audio object displayed in the virtual audio environment;
  obtaining, via the GUI, user input relating to audio properties associated with the selected audio object;
  performing an audio computation based on the user input;
  updating the selected audio object represented in the canvas; and
  displaying, via the GUI, the updated audio object in the canvas.

12. The method of claim 11, wherein an audio object of the plurality of audio objects is designated as a scene root audio object that provides a reference point at the center of the virtual audio environment on which the audio properties of one or more other audio objects are based.

13. The method of claim 11, wherein the selection of the audio object is a selection of a group of audio objects.

14. The method of claim 11, wherein the user input relating to the audio properties associated with the selected audio object includes specifying a hierarchical relationship between a first audio object and a second audio object, the hierarchical relationship indicating that updating first audio properties associated with the first audio object affects second audio properties associated with the second audio object.

15. The method of claim 11, wherein the GUI further includes:
  an object list that displays the plurality of audio objects included in the virtual audio environment as a list;
  a timeline panel that visually represents playback of a plurality of audio signals, a respective audio signal corresponding to a respective audio object of the plurality of audio objects included in the virtual audio environment; and
  an object inspector that displays the audio properties associated with the plurality of audio objects.

16. The method of claim 15, wherein the selection of the audio object is performed via a user selection input on the canvas, the object list, the timeline panel, or the object inspector, and the selection of the audio object is reflected on the canvas, the object list, the timeline panel, and the object inspector.

17. The method of claim 15, wherein the user input relating to the audio properties associated with the selected audio object involves hiding the selected audio object, the hiding the selected audio object including removing the selected audio object from being visually displayed or changing an opacity of the selected audio object in the canvas, the object list, the timeline panel, or the object inspector.

18. The method of claim 15, wherein a volume, a size, or a spread of a particular audio object is visually represented in the canvas, the object list, the timeline panel, or the object inspector.

19. The method of claim 11, wherein the user input relating to the audio properties associated with the selected audio object involves specifying a movement of the selected audio object, the movement of the selected audio object representing changes in a perceived directionality of the selected audio object by a human situated in a physical space corresponding to and represented by the virtual audio environment.

20. The method of claim 19, wherein specifying the movement of the selected audio object includes specifying one or more checkpoints to which the selected audio object is directed to move or a time taken for the selected audio object to move from a first checkpoint to a second checkpoint.

\* \* \* \* \*